(12) United States Patent
Yi et al.

(10) Patent No.: US 12,458,631 B2
(45) Date of Patent: Nov. 4, 2025

(54) USE OF DIHYDROBERBERINE OR ITS DERIVATIVES FOR ANTI-GLYCATION

(71) Applicant: NANJING NUTRABUILDING BIO-TECH CO., LTD., Nanjing (CN)

(72) Inventors: Ronghua Yi, Nanjing (CN); Mingru Wang, Nanjing (CN); Shawn Wells, Lewisville, TX (US); Kylin Liao, Nanjing (CN)

(73) Assignee: NANJING NUTRABUILDING BIO-TECH CO., LTD., Nanjing (CN)

( * ) Notice: Subject to any disclaimer, the term of this patent is extended or adjusted under 35 U.S.C. 154(b) by 277 days.

(21) Appl. No.: 17/973,852

(22) Filed: Oct. 26, 2022

(65) Prior Publication Data

US 2023/0133496 A1 May 4, 2023

(51) Int. Cl.
*A61K 31/4375* (2006.01)
*A61P 3/08* (2006.01)

(52) U.S. Cl.
CPC ............ *A61K 31/4375* (2013.01); *A61P 3/08* (2018.01)

(58) Field of Classification Search
CPC .............................. A61K 31/4375; A61P 3/08
See application file for complete search history.

(56) References Cited

U.S. PATENT DOCUMENTS 10,278,961 B2 * 5/2019 Lowery .............. A61K 31/4355
2017/0296520 A1 * 10/2017 Lowery ................ A61K 38/005

OTHER PUBLICATIONS

Buchanan, Beth, et al. "Comparative pharmacokinetics and safety assessment of transdermal berberine and dihydroberberine." PLoS One 13.3 (2018): e0194979. (Year: 2018).*
Morganti, P., et al. "Beauty mask: Market and environment." J. Clin. Cosmet. Dermatol 3.10.16966 (2019): 2576-2826 (Year: 2019).*

* cited by examiner

Primary Examiner — James H Alstrum-Acevedo
Assistant Examiner — Justin Christopher Sanchez
(74) Attorney, Agent, or Firm — ANOVA LAW GROUP, PLLC

(57) ABSTRACT

The present invention provides novel methods for anti-glycation, especially mitigating or preventing skin aging in a mammal, the method includes administration to the mammal of a composition including an effective amount of dihydroberberine (DHB) or its analog or its derivatives. The present invention also provides a composition including an effective amount of dihydroberberine (DHB) or its analog or its derivatives, for mitigating or preventing "Maillard reaction" in a mammal by controlling blood glucose, scavenging chronic ROS, reducing a level of MDA and expression of MMP-1. In addition, the present invention provides method for preparing any compositions disclosed herein.

8 Claims, 4 Drawing Sheets

United States Patent US 12,458,631 B2

USE OF DIHYDROBERBERINE OR ITS DERIVATIVES FOR ANTI-GLYCATION

CROSS REFERENCE TO RELATED APPLICATION

This application claims the benefit of a PCT International Application Number PCT/CN2021/128227, filed on Nov. 2, 2021, the content of which is hereby incorporated by reference in its entirety for all purposes.

FIELD OF THE INVENTION

The present invention generally relates to compositions, methods of preparing such compositions, and method of using such compositions for anti-glycation in a mammal.

BACKGROUND OF THE INVENTION

Skin aging is a complex, chronic process spanning several years where external and intrinsic factors engage and interact to create diverse macroscopic, microscopic, and biochemical changes that differ in extent inter-individually. This tends to cause distinct structural changes and affect not only its youthful appearance but also its various physiological functions.

Advanced glycation end products (AGEs) accumulation in tissues is known to be mainly related to the progression of skin aging since AGEs-modified collagen and elastin have been reported to have modified biomechanical properties leading to loss of elasticity and increased stiffening; changes that promote the appearance of wrinkles. Glycation occurs through a series of reactions, including "Maillard reaction," a slow non-enzymatic reaction that takes place between proteins i.e. primarily lysine and sugars such as glucose or ribose, leading to the formation and subsequent accumulation of AGEs. "Maillard reaction" also modifies the interaction of collagen with cells affecting their functions such as migration, differentiation, and proliferation.

The "Maillard reaction" is well known as a universal phenomenon in the skin. Specifically, the "Maillard reaction" increases uniformly with age, resulting in a uniform increase in the content of "Maillard reaction" products in the skin.

Thus, it is important and urgent to develop products that can resist glycation, ameliorate or prevent Maillard reaction, mitigate or prevent aging, especially reduce or even inhibit the process of skin aging, including the "Maillard reaction."

SUMMARY OF THE INVENTION

In a first aspect, the present invention provides a method for anti-glycation in a mammal, the method comprises administration to the mammal a composition comprising an effective amount of dihydroberberine or a pharmaceutically acceptable salt, acid, ester, analog or derivative thereof.

In some embodiments, the anti-glycation includes ameliorating or preventing Maillard reaction.

In some embodiments, the method is used for mitigating or preventing aging.

In some embodiments, the mitigating or preventing aging includes mitigating or preventing skin aging or Maillard reaction related skin aging signs.

In some embodiments, the mitigating or preventing skin aging or Maillard reaction related skin aging signs includes ameliorating or preventing fine wrinkles, orange-peel, or dull appearance of skin caused by Maillard reaction; resisting skin thickness decrease for both epidermis and dermis caused by Maillard reaction; preventing or reducing degradation of collagen fibers caused by Maillard reaction.

In some embodiments, the anti-glycation is achieved by controlling blood glucose, scavenging chronic ROS, reducing level of MDA and expression of MMP-1. In some embodiments, the Maillard reaction is ameliorated or prevented by controlling blood glucose, scavenging chronic ROS, reducing level of MDA and expression of MMP-1.

In some embodiments, the mammal is a human or a cattle or a pet.

In some embodiments, the composition is prepared in a form of food, drink, nutritional supplement, cosmetic product, or pharmaceutical composition.

In some embodiments, the dihydroberberine or a pharmaceutically acceptable salt, acid, ester, analog or derivative thereof is administrated at a daily dose of 10-2000 mg. In some embodiments, the dihydroberberine or a pharmaceutically acceptable salt, acid, ester, analog or derivative thereof is administrated at a daily dose of 20-1500 mg, 40-1000 mg, 60-800 mg, 80-600 mg, or 100-400 mg.

In some embodiments, the administration is through various routes selected from oral administration, intravenous injection, intramuscular injection, intraperitoneal injection, topical application, or sublingual application.

In some embodiments, the dihydroberberine or a pharmaceutically acceptable salt, acid, ester, analog or derivative thereof is formulated in solutions, liquid suspensions, parenteral solutions, injections, tablets, pills, granules, powders, film, (micro)capsules, aerosols, tonics, or syrups, beverages, nourishments, snacks, bars, gums, sugars, a facial mask composition, a functionalized cream composition, a functionalized essence, a skin care composition, a make-up composition or a functionalized food composition.

In some embodiments, the daily dose is administered in divided doses or a single dose. In some embodiments, the administration is at least once a day or more times a day. In some embodiments, the administration is at least 7 days and above in one period.

In a second aspect, the present invention provides a composition comprising an effective amount of dihydroberberine or a pharmaceutically acceptable salt, acid, ester, analog or derivative thereof, for anti-glycation in a mammal, to mitigate or prevent aging.

In some embodiments, the anti-glycation includes ameliorating or preventing Maillard reaction.

In some embodiments, the composition may mitigate or prevent aging.

In some embodiments, the mitigating or preventing aging includes mitigating or preventing skin aging or Maillard reaction related skin aging signs.

In some embodiments, mitigating or preventing skin aging or Maillard reaction related skin aging signs, includes ameliorating or preventing fine wrinkles, orange-peel, or dull appearance of skin caused by Maillard reaction; resisting skin thickness decrease for both epidermis and dermis caused by Maillard reaction; preventing or reducing degradation of collagen fibers caused by Maillard reaction.

In some embodiments, the anti-glycation is achieved by controlling blood glucose, scavenging chronic ROS, reducing level of MDA and expression of MMP-1. In some embodiments, the Maillard reaction is ameliorated or prevented by controlling blood glucose, scavenging chronic ROS, reducing level of MDA and expression of MMP-1.

In some embodiments, the dihydroberberine or a pharmaceutically acceptable salt, acid, ester, analog or derivative thereof is administrated at a daily dose of 10-2000 mg. In some embodiments, the dihydroberberine or a pharmaceutically acceptable salt, acid, ester, analog or derivative thereof is administered at a daily dose of 20-1500 mg, 40-1000 mg, 60-800 mg, 80-600 mg, or 100-400 mg.

In some embodiments, the composition is prepared in a form of food, drink, nutritional supplement, cosmetic product, or pharmaceutical composition.

In some embodiments, the dihydroberberine or a pharmaceutically acceptable salt, acid, ester, analog or derivative thereof is formulated in solutions, liquid suspensions, parenteral solutions, injections, tablets, pills, granules, powders, film, (micro)capsules, aerosols, tonics, or syrups, beverages, nourishments, snacks, bars, gums, sugars, a facial mask composition, a functionalized cream composition, a functionalized essence, a skin care composition, a make-up composition or a functionalized food composition.

In some embodiments, the mammal is a human or a cattle or a pet. In some embodiments, the daily dose is administered in divided doses or a single dose. In some embodiments, the administration is at least once a day or more times a day. In some embodiments, the administration is at least 7 days and above in one period. In some embodiments, the administration is through various routes selected from oral administration, intravenous injection, intramuscular injection, intraperitoneal injection, topical application, or sublingual application.

In a third aspect, the present invention provides use of a composition for preparing food, drink, nutritional supplement, cosmetic product, or pharmaceutical composition for anti-glycation in a mammal, wherein the composition comprises an effective amount of dihydroberberine or a pharmaceutically acceptable salt, acid, ester, analog or derivative thereof.

In some embodiments, the anti-glycation includes ameliorating or preventing Maillard reaction.

In some embodiments, the composition may mitigate or prevent aging.

In some embodiments, the mitigating or preventing aging includes mitigating or preventing skin aging or Maillard reaction related skin aging signs.

In some embodiments, the mitigating or preventing skin aging or Maillard reaction related skin aging signs includes ameliorating or preventing fine wrinkles, orange-peel, or dull appearance of skin caused by Maillard reaction; resisting skin thickness decrease for both epidermis and dermis caused by Maillard reaction; preventing or reducing degradation of collagen fibers caused by Maillard reaction.

In some embodiments, the Maillard reaction is ameliorated or prevented by controlling blood glucose, scavenging chronic ROS, reducing level of MDA and expression of MMP-1.

In some embodiments, the dihydroberberine or a pharmaceutically acceptable salt, acid, ester, analog or derivative thereof is administered at a daily dose of 10-2000 mg. In some embodiments, the dihydroberberine or a pharmaceutically acceptable salt, acid, ester, analog or derivative thereof is administered at a daily dose of 20-1500 mg, 40-1000 mg, 60-800 mg, 80-600 mg, or 100-400 mg.

In some embodiments, the dihydroberberine or a pharmaceutically acceptable salt, acid, ester, analog or derivative thereof is formulated in solutions, liquid suspensions, parenteral solutions, injections, tablets, pills, granules, powders, film, (micro)capsules, aerosols, tonics, or syrups, beverages, nourishments, snacks, bars, gums, sugars, a facial mask composition, a functionalized cream composition, a functionalized essence, a skin care composition, a make-up composition or a functionalized food composition.

In some embodiments, the mammal is a human or a cattle or a pet. In some embodiments, the daily dose is administered in divided doses or a single dose. In some embodiments, the administration is at least once a day or more times a day. In some embodiments, the administration is at least 7 days and above in one period. In some embodiments, the administration is through various routes selected from oral administration, intravenous injection, intramuscular injection, intraperitoneal injection, topical application, or sublingual application.

In a fourth aspect, the present invention provides a method for preparing any composition described herein.

These and other features, aspects, and advantages of the present invention will become better understood with reference to the following description and appended claims.

DETAILED DESCRIPTION OF THE INVENTION

Figure 1:
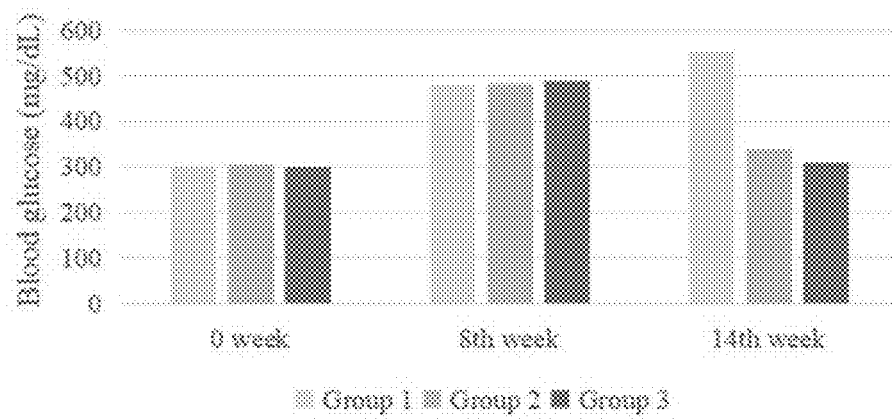
FIG. 1 is a graph of blood glucose levels of three groups of mice at the beginning of the trial (0 week), after the D-galactose injection (8th week), and at the end of the trial (14th week).

In the Summary Section above and the Detailed Description Section, and the claims below, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

As used herein, the term "or" is meant to include both "and" and "or." In other words, the term "or" may also be replaced with "and/or."

As used herein, the singular forms "a," "an" and "the" are intended to include the plural forms as well, unless the context clearly indicates otherwise.

As used herein, the term "comprise" or "include" and their conjugations, refer to a situation wherein said terms are used in their non-limiting sense to mean that items following the word are included, but items not specifically mentioned are not excluded. It also encompasses the more limiting verb 'to consist essentially of' and 'to consist of'.

The present invention provides novel methods or compositions for anti-glycation in a mammal. Anti-glycation includes ameliorating or preventing Maillard reaction, may mitigate or prevent aging, especially skin aging or Maillard reaction related skin aging signs.

Skin aging is a complex process. Macroscopically, skin aging is recognized by fine wrinkles, loss of elasticity, orange-peel or dull appearance of the skin, reduced epidermal and dermal thickness. Microscopically, typical characteristics of skin aging include epidermal atrophy, decreased mitotic rate of basal keratinocytes, decreased proliferative capacity and cellular senescence, atrophy of the dermal extracellular matrix and change of the physiological properties of connective tissues.

Many theories have been proposed that traditional Chinese medicine, berberine (BBR), a natural plant alkaloid extracted from *Berberis aristata* and *Coptis chinensis* (Huanglian), has been shown to be able to control the blood glucose levels, which in turn could lower the AGEs level.

Dihydroberberine (DHB) is a metabolite of berberine (BBR). Pharmacokinetic analyses have indicated that nitroreductases of the gut microbiota reduces BBR to its absorbable form Dihydroberberine (DHB), which displays improved absorption and enhanced oral bioavailability (Feng, R., et al., *Transforming berberine into its intestine-absorbable form by the gut microbiota*. 2015. 5(1): p. 1-15). The inventors of this invention show that DHB also has similar benefits of BBR and works better than BBR.

Based on some relevant theories, the "Maillard reaction" depends on various factors. Ultraviolet (UV) radiation is the most crucial factor capable of inducing oxidative stress and activation of lipid peroxidase-like malondialdehyde (MDA) and matrix metalloproteinase (MMP), which drives the "Maillard reaction" process. Besides, a higher dietary intake of carbohydrates, which induces high glucose levels, is also associated with the "Maillard reaction." The known mechanism by which carbohydrates cause oxidative stress is the activation of mitochondrial oxidative metabolism of glucose, which leads to the generation of reactive oxygen species (ROS). The increased levels of mitochondrial ROS lead to the activation of a number of biochemical pathways, some of which lead to the formation of AGEs. Other main factors leading to the "Maillard reaction" are, with the increase of age, the decrease in the activity of antioxidative enzymes in the body, such as superoxide dismutase (SOD), catalase (CAT), glutathione (GSH), and glutathione peroxidase (GSH-Px), leading to a decrease in the ability to scavenge free radicals, which in turn leads to free radical chain reaction and eventually causes lipid peroxidation end-product of MDA to increase.

"Maillard reaction related skin aging signs" are caused by increased "Maillard reaction" products in the skin. The signs include, but not limited to, loss of skin elasticity, decreased skin thickness, and skin wrinkles.

Inventors of this invention have found that DHB is able to protect the structure of skin effectively during aging, like resisting skin thickness decrease for both epidermis and dermis, and prevent or reduce the degradation of collagen fibers (see Example 3).

Here, "resisting" refers to counter, or withstand the action or effect of skin thickness decrease caused by "Maillard reaction" so that skin thickness will not decrease or decrease at a slower rate.

"Collagen fiber" is the fiber in the extracellular matrix of connective tissues characterized by being elongated and made up of collagen glycoproteins. It is typically arranged in branching bundles of indefinite length. It is a strong insoluble fiber. It occurs in the skin, tendon, ligaments, bone, and cartilage. Degradation of collagen fibers in skin often leads to skin aging.

As used herein, the term "effective amount" refers to the amount required to achieve the effect as taught herein. The specific effective dose level for any particular subject will depend upon a variety of factors including the signs being treated and the severity of the signs; the specific composition employed; the age, body weight, general health, sex and diet of the subject; the time of administration, route of administration, and rate of excretion of dihydroberberine (DHB) or its analog or its derivatives employed; the duration of the treatment; and like factors well known in the medical arts. For example, it is well known within the skill of the art to start doses of the compound at levels lower than those required to achieve the desired effect and to gradually increase the dosage until the desired effect is achieved.

One of skill in the art recognizes that an amount may be considered "effective" even if the signs are not totally eradicated or prevented, but it or its symptoms and/or effects are improved or alleviated partially in the subject.

As used herein, the term "pharmaceutically acceptable" means pharmaceutically, physiologically, alimentarily, and/or nutritionally acceptable, and refers to those compositions or combinations of agents, materials, or compositions, and/or their dosage forms, which are within the scope of sound medical judgment, suitable for use in contact with the tissues of human beings and animals without excessive toxicity, irritation, allergic response, or other problem or complication, commensurate with a reasonable benefit/risk ratio.

As used herein, the term "mammal" or "subject" may be used interchangeably to refer to any animal to which the presently disclosed methods and compositions may be applied or administered. The animal may have an illness or other disease, but the animal does not need to be sick to benefit from the presently disclosed methods and compositions. As such any animal may apply the disclosed combinations, compositions or kits, or be a recipient of the disclosed methods. "Mammal" includes, without limitation, mice, rats, rabbits, guinea pigs, dogs, cats, sheep, goats, cows, horses, primates, such as monkeys, chimpanzees, and apes, and, in particular, humans. Although the animal subject is preferably a human, the methods and compositions of the invention have application in veterinary medicine.

In some embodiments, the mammal is human, a cattle, or a pet.

As used herein, "pet" includes, without limitation, mice, rats, rabbits, guinea pigs, dogs, cats, and sheep.

The dosage of dihydroberberine or a pharmaceutically acceptable salt, acid, ester, analog or derivative thereof and/or composition comprising the same may range broadly, depending upon the desired effects and the indication. The daily dosage regimen for an adult human patient may be, for example, an oral dose of between 0.01 mg and 3000 mg of dihydroberberine or its analog or derivative, preferably between 1 mg and 700 mg, e.g. 5 to 200 mg, or between about 0.1 mg and about 1,000 mg of dihydroberberine or its analog or derivative per kg of body weight of the subject. The dosage may be a single one or a series of two or more given in the course of one or more days, as is needed by the subject. In some embodiments, the compounds are administered for a period of time, for example for a week or more, or for months or years.

As used herein, the term "administration" refers to the process of delivering a disclosed composition or active ingredient to a subject. The compositions of the invention can be administered in a variety of ways, including orally, intragastrically, and parenterally (e.g., intravenous and intraarterial as well as other suitable parenteral routes), and the like.

Multiple techniques of administering a composition exist in the art including, but not limited to, oral, rectal, topical, aerosol, injection and parenteral delivery, including intramuscular, subcutaneous, intravenous, intramedullary injections, intrathecal, direct intraventricular, intraperitoneal, intranasal and intraocular injections.

"Intraperitoneal" as used here means within or administered through the peritoneum. The peritoneum is a thin, transparent membrane that lines the walls of the abdominal (peritoneal) cavity and contains/encloses the abdominal organs such as the stomach and intestines.

As used herein, "sublingual" refers to situated or applied under the tongue.

A "functionalized cream composition" includes a cream composition that has a potentially positive effect on health beyond basic nutrition.

An "essence" includes an extract or concentrate obtained from a particular plant or other matter and used for flavoring or scent. A "functionalized essence" includes an essence that has a potentially positive effect on health beyond basic nutrition.

A "functionalized food composition" includes a food composition that has a potentially positive effect on health beyond basic nutrition.

Any titles or subheadings used herein are for organization purposes and should not be used to limit the scope of embodiments disclosed herein.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for.

All publications and patent applications cited in this specification are herein incorporated by reference as if each individual publication or patent application were specifically and individually indicated to be incorporated by reference.

EXAMPLES

Six-week-old, male, Kunming mice, weighed about 30±2 g, were obtained from Cavens Lab Animal (Changzhou, China) and housed in a controlled room (25±2° C., 60% relative humidity, 12 h light/dark cycle) with free access to water and standard laboratory diet. After an acclimation period (1 week), mice were randomly divided into 3 groups of 9 animals. Choose the mice's back skin as the experimental observation area, use a razor to shave off the back hair of the mice. Apply 5% sodium sulfide solution to the back of the mice to remove the hair.

Then all mice were injected subcutaneously with the same volume of D-galactose (1000 mg/kg), once a day for 8 weeks. During the entire process of the experiment, the daily food intake and weight of mice were recorded every day, and the D-galactose injection dose was adjusted following the weight change.

The 3 groups of 9 animals were (1) non-supplement group (Con, Group 1); (2) DHB supplement group (DHB, 100 mg/kg, Group 2); (3) DHB supplement group (DHB, 200 mg/kg, Group 3). Mice in group 2 and group 3 were injected subcutaneously (s.c.) into their back skins with the corresponding concentrations of DHB before each major meal once daily for 6 weeks.

All mice were sacrificed following 6 weeks at the end of the experiment. The skin tissue was divided into three parts, the first part was stored at −80° C. until assays were performed, the second part was immediately collected, weighed and homogenized (4° C.; 3500 rpm for 15 min) for biochemical and histological analyses, and the third part was fixed in 10% formalin until further use.

Example 1

Measurement of the Blood Glucose Level Shows that DHB is Able to Control Blood Glucose When all mice were on fasting, collect approximately 10 µL of blood by the tail nick for 3 times, at the beginning of the trial (0 week), after the D-galactose injection (8th week), and at the end of the trial (14th week). Use the glucometer to measure the glucose level.

FIG. 1 is a graph of blood glucose levels of three groups of mice at the beginning of the trial (0 week), after the D-galactose injection (8th week), and at the end of the trial (14th week). As shown in FIG. 1, AGEs were formed successfully by D-galactose. Fortunately, blood glucose levels were decreased significantly in the DHB groups after supplementation. At the end of the experiment, i.e., at 14th week, the blood glucose level was decreased by about 39% and even 44% in the group 2 and group 3, respectively, compared to the non-supplement group. Thus, DHB is very good for blood glucose control.

Example 2

DHB is Able to Scavenge Chronic ROS, Reduce the Level of MDA and the Expression of MMP-1

As introduced before, oxidative stress is increased during skin aging. The changes of oxidoreductase activities should be paid high attention. Skins were lysed into homogenate using normal saline or RIPA tissue cracking agent. The levels of $H_2O_2$, MDA, SOD, CAT, GSH, and GSH-Px in the skin were detected with relative kits as reference. Using the ELISA method to confirm the content of MDA during the trial. Measurement of the activities of four typical antioxidative enzymes, such as SOD, CAT, GSH, and GSH-Px could indicate whether DHB has the ROS-cleaning ability. Quantitative polymerase chain reaction (QPCR) and western blot methods were used to measure the expression of MMP-1 in the skin.

Figure 2A:
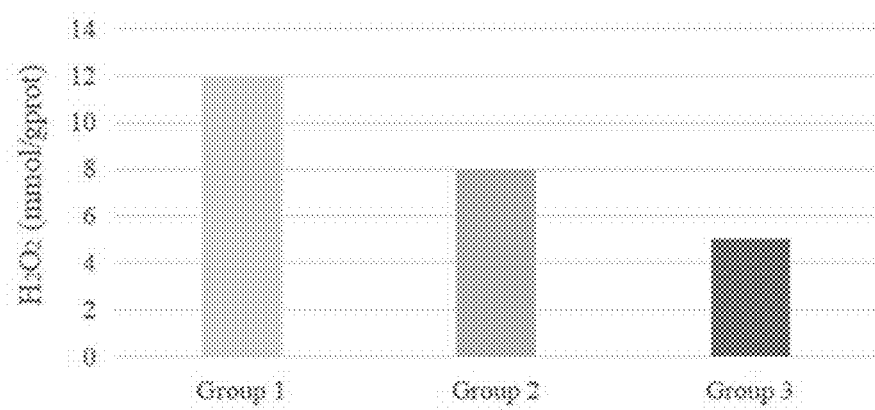
FIG. 2a is a graph of $H_2O_2$ content of three groups of mice at the end of the trial (14th week).

FIG. 2a is a graph of $H_2O_2$ content of three groups of mice at the end of the trial (14th week). As shown in FIG. 2a, compared to the non-supplement group, the $H_2O_2$ content was decreased by about 33% and 58% in group 2 and group 3, respectively.

Figure 2B:
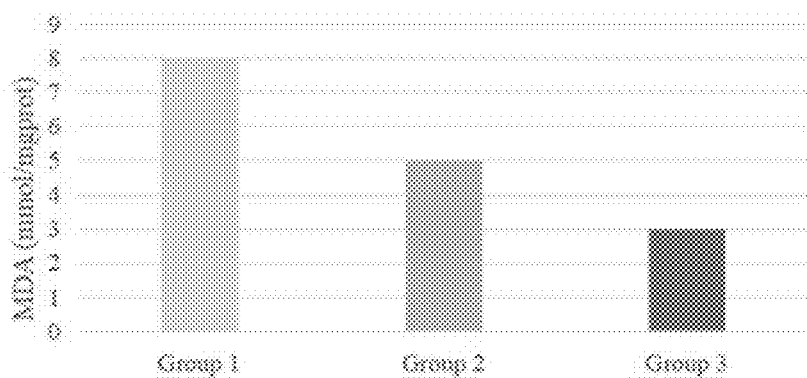
FIG. 2b is a graph of MDA content of three groups of mice at the end of the trial (14th week).

FIG. 2b is a graph of MDA content of three groups of mice at the end of the trial (14th week). As shown in FIG. 2b, the content of MDA in the group 3 was even 63% lower than that in the control group.

Figure 2C:
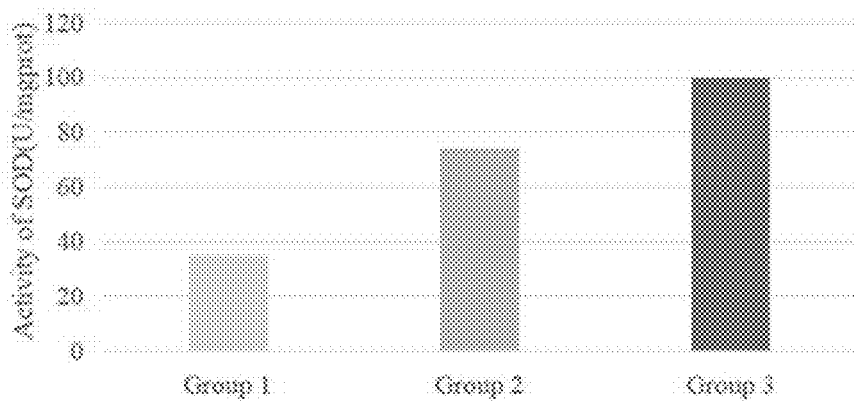
FIG. 2c is a graph of SOD activity of three groups of mice at the end of the trial (14th week).
Figure 2D:
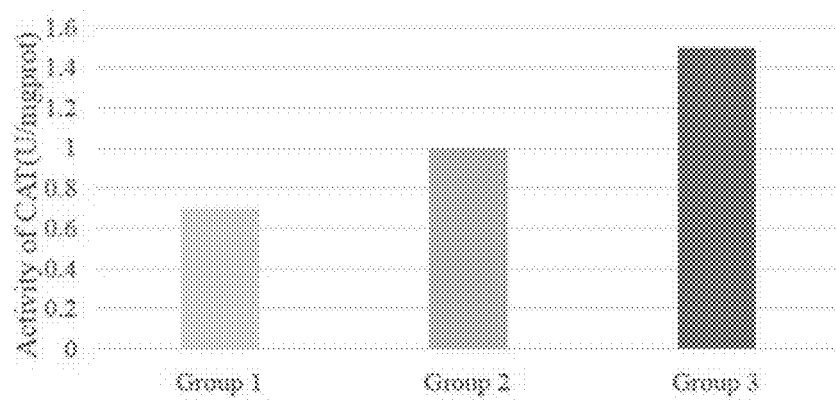
FIG. 2d is a graph of CAT activity of three groups of mice at the end of the trial (14th week).
Figure 2E:
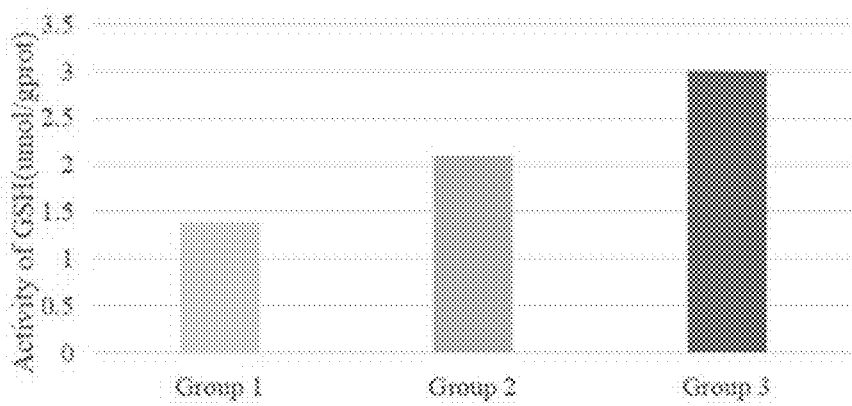
FIG. 2e is a graph of GSH activity of three groups of mice at the end of the trial (14th week).
Figure 2F:
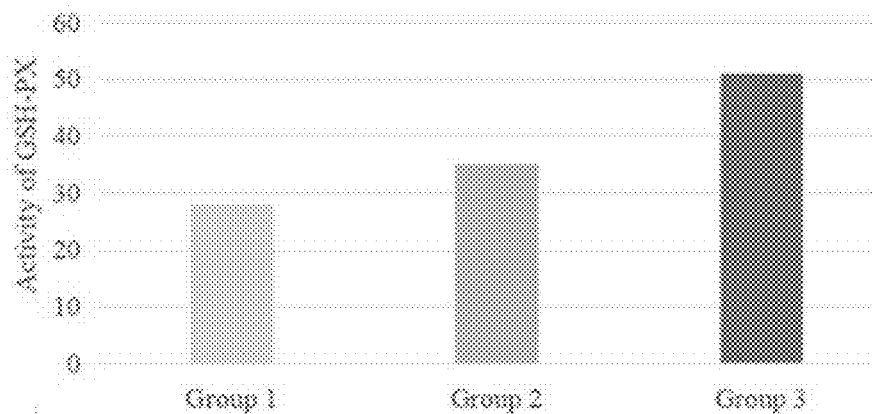
FIG. 2f is a graph of GSH-PX activity of three groups of mice at the end of the trial (14th week).

FIG. 2c is a graph of SOD activity of three groups of mice at the end of the trial (14th week). FIG. 2d is a graph of CAT activity of three groups of mice at the end of the trial (14th week). FIG. 2e is a graph of GSH activity of three groups of mice at the end of the trial (14th week). FIG. 2f is a graph of GSH-PX activity of three groups of mice at the end of the trial (14th week). FIG. 2c-2f indicated that the activities of four typical anti-oxidative enzymes were significantly improved after DHB supplementation. Specifically, the SOD, CAT, GSH and GASH-Px in group 3 increased markedly about 2.9, 2.1,2.1, 1.8 times, respectively, compared to non-supplementation group.

Figure 2G:
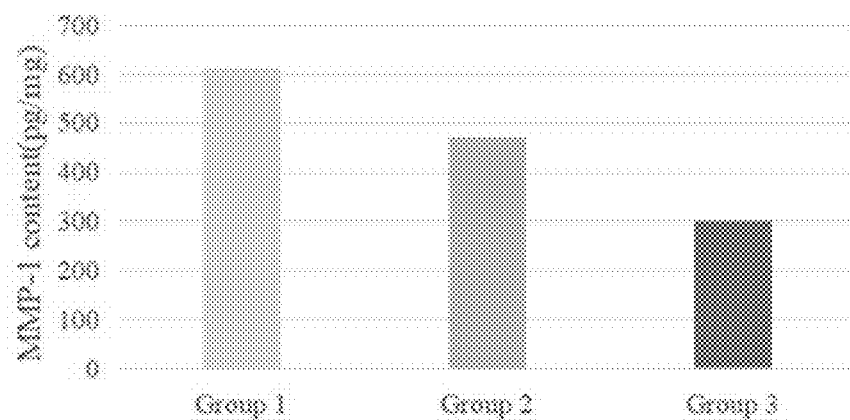
FIG. 2g is a graph of MMP-1 content of three groups of mice at the end of the trial (14th week).

FIG. 2g is a graph of MMP-1 content of three groups of mice at the end of the trial (14th week). The MMP-1 expression reduced significantly in group 2 (by about 23%) and group 3 (by about 51%), compared to non-supplement group (FIG. 2g).

Therefore, DHB not only could reduce $H_2O_2$ and MDA productions, and MMP-1 expression during aging, but also is an excellent antioxidant and could scavenge ROS.

Example 3

DHB is Able to Protect the Structure of Skin Aging Effectively, Such as to Resist Skin Thickness Decrease for Both Epidermis and Dermis, and to Prevent or Reduce the Degradation of Collagen Fibers Hematoxylin-eosin staining (H&E) and Masson staining were performed on skin samples. Skins were fixed in 10% formalin 48 h at room temperature and paraffin-embedded afterward. With H&E staining, skins were sliced into 4 μm, dehydrated of gradient ethanol, and stained with hematoxylin and eosin. For Masson staining, sliced skins were stained with a Masson kit as the instruction said. H&E staining to observe the skin epidermis and dermis structure change and analyze stained collagen fibers by Image-Pro Plus 6.0 in the perspective of 400 times to detect the percentage of collagen fibers area. To further examine the content of skin collagen fibers, this was determined by Masson's staining. Then quantitation of skin epidermis and dermis, and collagen were calculated based on the results of observation.

Figure 3A:
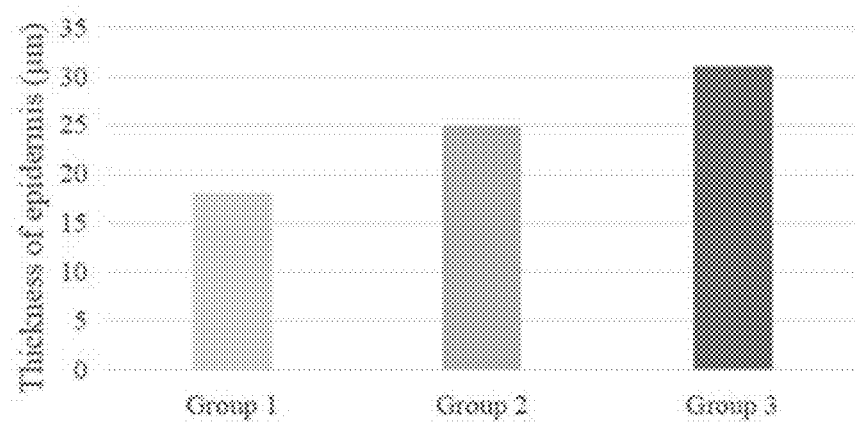
FIG. 3a is a graph of quantitation of skin epidermis in three groups of mice at the end of the trial (14th week).
Figure 3B:
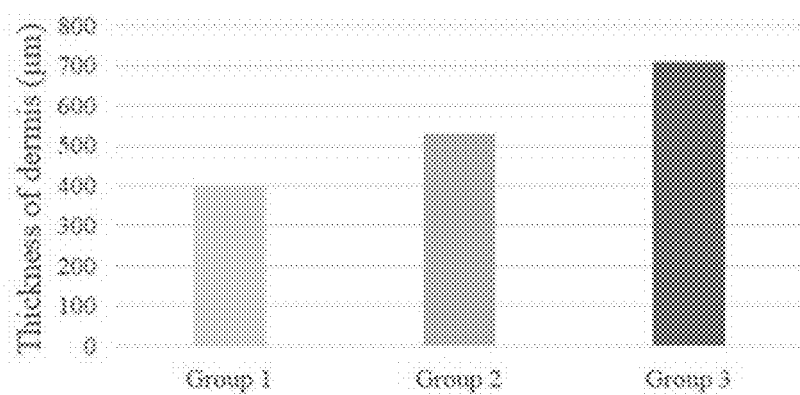
FIG. 3b is a graph of quantitation of skin dermis in three groups of mice at the end of the trial (14th week).

FIG. 3a is a graph of quantitation of skin epidermis in three groups of mice at the end of the trial (14th week). FIG. 3b is a graph of quantitation of skin dermis in three groups of mice at the end of the trial (14th week). In FIGS. 3a-3b, the epidermal and dermal in DHB supplemented groups were both significant thicker than that in control group. Moreover, group 3 could prevent or reduce the epidermal and dermal thickness decrease by even 72% and 78%. Thus, DHB could protect the structure of aging effectively.

Figure 3C:
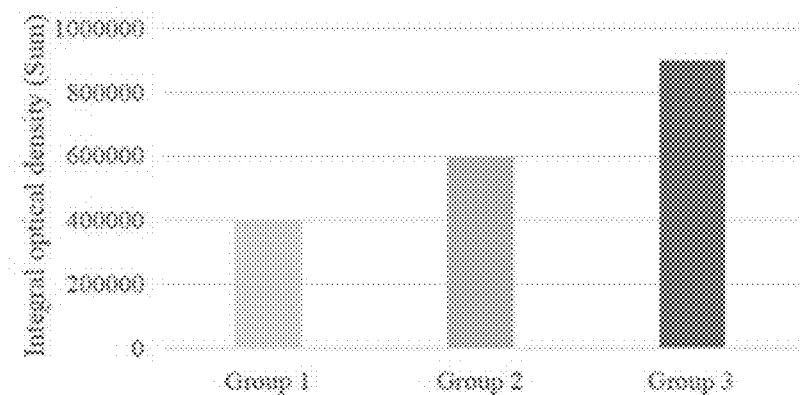
FIG. 3c is a graph of quantification of collagen in three groups of mice at the end of the trial (14th week).

FIG. 3c is a graph of quantification of collagen in three groups of mice at the end of the trial (14th week). As well known, skin can keep firm up, smooth and tender mainly depending on the content of dermal collagen. As shown in FIG. 3c, compared with the control group, the contents of collagen in the skin tissue of the DHB supplement groups were significantly higher, especially in higher dose group (2.2 times higher than control group). So DHB could delay aging by improving the collagen fibers content.

As shown in the above examples, the methods and compositions of the present invention could control blood glucose, scavenge chronic ROS, reduce $H_2O_2$ and MDA productions, and MMP-1 expression during aging, thus ameliorating or preventing Maillard reaction and/or resisting glycation (i.e., anti-glycation). In addition, the methods and compositions of the present invention could mitigate or prevent aging, for example, mitigate or prevent skin aging or Maillard reaction related skin aging signs, such as resist skin thickness decrease for both epidermis and dermis caused by Maillard reaction; prevent or reduce degradation of collagen fibers caused by Maillard reaction; and ameliorate or prevent fine wrinkles, orange-peel, or dull appearance of skin caused by Maillard reaction.

Although specific embodiments and examples of this invention have been illustrated herein, it will be appreciated by those skilled in the art that any modifications and variations can be made without departing from the spirit of the invention. The examples and illustrations above are not intended to limit the scope of this invention. Any combination of embodiments of this invention, along with any obvious their extension or analogs, are within the scope of this invention. Further, it is intended that this invention encompass any arrangement, which is calculated to achieve that same purpose, and all such variations and modifications as fall within the scope of the appended claims.

What is claimed is:

1. A method for preventing or reducing degradation of collagen fibers in skin of an individual, the method comprising administration to the individual a composition comprising an effective amount of dihydroberberine or a pharmaceutically acceptable salt, acid, ester, analog or derivative thereof, wherein the dihydroberberine or the pharmaceutically acceptable salt, acid, ester, analog or derivative thereof is formulated in a facial mask composition, a functionalized cream composition, a functionalized essence, a skin care composition, or a make-up composition.

2. The method of claim 1, wherein the method is used for mitigating or preventing aging.

3. The method of claim 2, wherein the mitigating or preventing aging includes mitigating or preventing skin aging or Maillard reaction related skin aging signs.

4. The method of claim 3, wherein the mitigating or preventing skin aging or Maillard reaction related skin aging signs includes ameliorating or preventing fine wrinkles, orange-peel, or dull appearance of skin caused by Maillard reaction; resisting skin thickness decrease for both epidermis and dermis caused by Maillard reaction; preventing or reducing degradation of collagen fibers caused by Maillard reaction.

5. The method of claim 1, wherein the individual is a human.

6. The method of claim 1, wherein the composition is prepared in a form of cosmetic product.

7. The method of claim 1, wherein the dihydroberberine or the pharmaceutically acceptable salt, acid, ester, analog or derivative thereof is administrated at a daily dose of 10-2000 mg.

8. The method of claim 1, wherein the administration is through topical application.

* * * * *